United States Patent
Shiraki

(10) Patent No.: US 9,583,848 B2
(45) Date of Patent: Feb. 28, 2017

(54) ELECTRICAL CONNECTION BOX

(71) Applicant: Sumitomo Wiring Systems, Ltd., Yokkaichi, Mie (JP)

(72) Inventor: Takashi Shiraki, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 15/062,966

(22) Filed: Mar. 7, 2016

(65) Prior Publication Data
US 2016/0294075 A1   Oct. 6, 2016

(30) Foreign Application Priority Data

Mar. 18, 2015  (JP) ................. 2015-054312

(51) Int. Cl.
*H01R 9/18* (2006.01)
*H01R 9/22* (2006.01)

(52) U.S. Cl.
CPC ............. *H01R 9/18* (2013.01); *H01R 9/223* (2013.01); *H01R 2201/26* (2013.01)

(58) Field of Classification Search
CPC . H01R 9/18; H01R 9/16; H01R 9/223; H01R 13/582; H01R 13/5825
See application file for complete search history.

(56) References Cited

U.S. PATENT DOCUMENTS

| | | | |
|---|---|---|---|
| 7,837,480 B2 * | 11/2010 | Akahori | B60R 16/0238 439/76.2 |
| 7,893,364 B2 | 2/2011 | Oda | |
| 8,435,071 B2 * | 5/2013 | Grosskopf | H01R 9/223 439/113 |
| 8,710,366 B2 * | 4/2014 | Rosen | H01R 9/223 174/50 |
| 8,974,235 B2 * | 3/2015 | Washihira | H02G 3/16 174/535 |
| 9,124,079 B2 * | 9/2015 | Takeuchi | B60R 16/0238 |
| 2008/0200045 A1 * | 8/2008 | Akahori | H01R 13/514 439/76.2 |
| 2016/0294075 A1 * | 10/2016 | Shiraki | H01R 9/18 |

FOREIGN PATENT DOCUMENTS

JP       2593663 B     2/1999

* cited by examiner

*Primary Examiner* — Ross Gushi
(74) *Attorney, Agent, or Firm* — Reising Ethington, P.C.

(57) ABSTRACT

An electrical connection box for installation in a space that has a small vertical height. The electrical connection box includes horizontal terminal guide portion, an insertion hole for the tip of the terminal guide portion, a bolt fastening terminal connected to an end of an electrical wire, an electrical wire connection portion and an electrical contact portion. The terminal guide portion includes a side wall that has a step conforming to the shape of a barrel crimped portion of the bolt fastening terminal, a flat plate-shaped side wall that opposes the side wall that has the step, and upper and lower walls. The terminal guide portion is shaped so as to be fitted with and hold the electrical wire connection portion, and does not allow insertion of the bolt fastening terminal into the terminal guide portion in an opposite orientation. Visual check openings are provided in the upper wall of the terminal guide portion.

5 Claims, 11 Drawing Sheets

ELECTRICAL CONNECTION BOX

This Application claims the benefit of Japanese Application No. JP2015-054312, filed on Mar. 18, 2015, the contents of which are hereby incorporated by reference in their entirety.

FIELD

The present invention generally relates to an electrical connection box, and specifically to an electrical connection box such as a relay box or a fuse box installed in an automobile. In cases where there is little space for the installation of the electrical connection box, particularly in the case where it is difficult for a thick electrical wire that is not easily bent to be drawn downward from the electrical connection box, the present electrical connection box makes it possible for the thick electrical wire to be drawn to the outside.

BACKGROUND

An electrical connection box, such as a fuse relay box or a junction box, installed in an automobile internally accommodates a bus bar, a relay or a fuse, and electrical wires for connection thereto which are drawn to the outside of the case. If there is little space for the installation of this type of electrical connection box in terms of vertical height due to the design aspect, the arrangement relationship with other installed parts, or the like, it may be necessary to raise the bottom wall of the lower case of the electrical connection box and decrease the height of the electrical connection box.

If an electrical wire in an electrical connection box whose height has been reduced in this way is drawn downward, it comes into contact with the bottom wall, and thus it is difficult for the electrical wire to be drawn out downward. For example, as shown by the dashed double-dotted line in FIG. 8A, if the upper end portion of a tire house or wheel well H of an automobile is located at a position higher than the conventional position, the position of the lower surface of the rear portion of an electrical connection box 100 installed above the tire house rises from the position at the dashed single-dotted line to the solid line position. Accordingly, as shown in FIG. 8B, when a terminal 120 is connected to a bus bar 110 of an internal circuit member through the lower surface of the rear portion of the electrical connection box 100, an electrical wire 130 extends downward in a state of extending without interfering with a bottom wall 100a of the electrical connection box 100, but in the above case, the electrical wire 130 interferes with the bottom wall 100a as shown in FIGS. 8C and 8D, and there have been problems such as the electrical wire becoming damaged, a detachment-direction load being applied to the junction with the bus bar due to excessive bending of the electrical wire, and degradation in the electrical connection reliability. In particular, if the electrical wire 130 is a thick electrical wire that is not easily bent, it is difficult for the thick electrical wire to extend downward and be bent to the side so as to follow the bottom wall 100a, and it becomes very difficult to install the electrical connection box 100 above the tire house H.

In general, a thick electrical wire has a core cross-sectional area of 8 mm$^2$ or more, and since thick electrical wires are often used as power supply lines or the like and have bolt fastening terminals connected to their ends, thick electrical wires have a large curvature and are not easily bent, as mentioned above. In the case where it is difficult for a thick electrical wire to be drawn out downward from the electrical connection box, if the thick electrical wire is drawn out horizontally, instead, it may avoid interfering with the bottom wall of the electrical connection box. In such a case, drawing out the thick electrical wire in the horizontal direction requires the bolt fastening terminal connected to the end of the thick electrical wire to be bolt-fastened to the bus bar in a horizontally lateral orientation.

Also, in the case where a bolt fastening terminal is connected to the end of an electrical wire and bolt-fastened to a bus bar accommodated in an electrical connection box, as shown in FIG. 9A, it is necessary to bring a base plate 123 of a bolt fastening terminal 122 into contact with a bus bar 110 and fasten it thereto using a bolt B in the regular orientation in which a barrel crimping portion 124 is on the opposite side. However, there are cases where, as shown in FIG. 9B, the bolt fastening terminal 122 faces the opposite direction and is forcibly fastened to the bus bar 110 using the bolt B in an erroneous assembly, and the bolt fastening terminal becomes damaged.

In particular, there is a risk of the erroneous assembly shown in FIG. 9B occurring if the bolt fastening position of the bus bar 110 cannot be viewed from the outside.

As a configuration for connecting a bolt fastening terminal, which is connected to the end of an electrical wire that is to be laid out in the horizontal direction, to a bus bar in an electrical connection box, Japanese patent no. 4356741 (Patent Document 1), which was submitted by the same applicant as this application, conventionally provides the electrical connection box shown in FIGS. 10A and 10B for preventing an electrical wire drawn out from the electrical connection box from interfering with other parts arranged in the vicinity. In this electrical connection box, the electrical wire crimping portion of a bolt fastening terminal 150, which is connected to an electrical wire W by crimping, is covered by a terminal cover 210, and the terminal cover 210 is fitted into a notch 200a provided in an outer wall of a main body case 200 of the electrical connection box, and is joined to the outer wall. The bolt fastening terminal 150 is connected to the end of the electrical wire W, which is to be laid out in the horizontal direction, and is provided with a vertical electrical contact portion 152 that extends straight out from the crimping portion of a crimping barrel 151, and a horizontal bent portion 153 that is obtained by the width-direction upper end of the electrical contact portion 152 being bent 90 degrees outward. A bolt hole 154 provided in the bent portion 153 is fastened to a horizontal bus bar, which is arranged inside the electrical connection box, using a bolt B.

Similarly, according to Japanese registered utility model 2593663 (Patent Document 2), as shown in FIG. 11, a bolt fastening terminal 300 connected to the end of a power supply electrical wire W that is to be laid out in the horizontal direction is provided with an electrical wire connection portion 301, a portion 302 that extends straight out from the electrical wire connection 301, and an L-shaped bent portion 305 obtained by a side end of the portion 302 being bent 90 degrees. A bolt hole 310 provided in the L-shaped bent portion 305 is placed over and fastened to an L-shaped bent portion of a bus bar, using a bolt.

JP 4356741B and JP 2593663Y are examples of related art.

As shown in Patent Documents 1 and 2, conventionally, in the case where an electrical wire constituted by a power supply wire or the like is to be laid out in the horizontal direction and connected to a bus bar in an electrical connection box, the bolt fastening terminal connected to the end of the electrical wire is provided with an electrical wire connection portion that is crimped by a barrel, and a bent portion that extends straight out from the electrical wire connection portion and is bent 90 degree along one width-direction edge of the electrical contact portion, and a bolt hole is provided in the bent portion and fastened to the bus bar using a bolt. However, the bolt fastening terminals disclosed in Patent Documents 1 and 2 are not shaped for general use, but rather are dedicated parts that have special shapes.

Conventionally, a general-purpose bolt fastening terminal used for connection to the end of a thick electrical wire, such as a power supply line, is shaped so as to include an electrical wire connection portion that is provided with a barrel, an electrical connection portion that extends straight out from the electrical wire connection portion, and a bolt hole provided in the electrical connection portion. In other words, it does not have the special shape of the electrical contact portions of Patent Documents 1 and 2, which are provided with a bent portion that has the bolt hole.

As described above, if a bolt fastening terminal connected to the end of an electrical wire that is to be laid out in the horizontal direction has a special shape of being provided with a bent portion, the cost rises due to the terminal being a dedicated part, it is necessary to also provide the electrical connection box with a portion for positioning, holding, and protecting the bolt hole-including bent portion of the terminal, and so on, and therefore there has been the problem of the structure of the electrical connection box becoming complex.

The electrical connection box disclosed herein was achieved in light of the above-described problems, and an object thereof is to provide an electrical connection box that has a reduced cost due to being able to use a general-purpose part as the bolt fastening terminal, and is able to, using a simple structure, position the general-purpose bolt fastening terminal in the insertion direction and furthermore protect it.

SUMMARY

In order to achieve the aforementioned object, there is provided an electrical connection box in which a horizontal terminal guide portion is provided inside the electrical connection box, and an insertion hole for a tip of the terminal guide portion is provided in a side wall of the electrical connection box, a bolt fastening terminal is provided with a bolt hole in a flat plate-shaped electrical contact portion connected to an electrical wire connection portion provided with a barrel, the bolt fastening terminal is connected to an end of an electrical wire, the bolt fastening terminal and the electrical wire are oriented in a horizontal direction, the bolt fastening terminal is inserted into the terminal guide portion, the electrical wire connection portion is held by the terminal guide portion, and the electrical contact portion extending from the electrical wire connection portion is bolt-fastened to a bus bar accommodated in the electrical connection box, and the terminal guide portion includes a side wall that has a step conforming to a shape of a barrel crimped portion of the bolt fastening terminal, a flat plate-shaped side wall that opposes the side wall that has the step, and upper and lower walls, is shaped so as to be fitted with and hold the electrical wire connection portion, and does not allow insertion of the bolt fastening terminal into the terminal guide portion in an opposite orientation, and visual check openings are provided in the upper wall of the terminal guide portion.

The terminal guide portion may receive insertion of and hold the electrical wire connection portion of the bolt fastening terminal, a back surface side of the electrical contact portion of the bolt fastening terminal that projects more than the terminal guide portion may be brought into contact with a bus bar accommodated and held in the electrical connection box, a front surface side of the electrical contact portion may be positioned so as to face a bolt insertion space, and a bolt may be inserted in a lateral orientation into the bolt insertion space from the outside and fastened to a nut provided on a back surface of the bus bar.

With the present electrical connection box having the above configuration, the bolt fastening terminal is inserted into and joined to the terminal guide portion in the horizontally lateral orientation, thus making it possible for the electrical wire connected to the bolt fastening terminal to be drawn out in the horizontal direction without being bent, and making it possible to efficiently arrange the electrical connection box and the electrical wire in a space having a small vertical height. Moreover, even if the general-purpose bolt fastening terminal that has a bolt hole in the electrical contact portion and does not have a bent portion is connected to the end of a thick electrical wire that is not easily bent, a connection can be made with the electrical wire and the bolt fastening terminal in the horizontal direction. Also, since the bolt fastening terminal does not have a special-purpose shape, it is possible to suppress a rise in cost.

Also, the electrical wire can be connected in the correct orientation, without making a mistake in the orientation of the bolt fastening terminal in the terminal guide portion of the electrical connection box, and it is possible to improve the ease of the electrical wire connection task.

Moreover, a general-purpose bolt fastening terminal rather than a specially shaped dedicated part is used as the bolt fastening terminal connected to the end of the electrical wire laid out horizontally, thus making it possible to implement the bolt fastening terminal without a rise in cost, and thus the present design has a high practical value.

Furthermore, since the bolt fastening terminal is inserted into the terminal guide portion in a horizontally lateral orientation, the bolt fastening terminal can be provisionally held in the inserted state. In other words, if the bolt fastening terminal is inserted from below and faces upward, it falls due to its own weight, but it if is inserted in a horizontally lateral orientation, and also a side wall of the terminal guide portion conforms to the shape of the bolt fastening terminal, the bolt fastening terminal is not likely to fall out from the terminal guide portion, and the bolt fastening terminal can be provisionally held until it is actually fixed by bolt fastening, thus making it possible to improve the ease of the fastening task.

Furthermore, since the visual checking openings are provided in the upper wall of the terminal guide portion, there are various advantages, such as that whether or not the bolt fastening terminal has been inserted into and held in the terminal guide portion in the correct state can be visually checked before performing bolt fastening.

If the electrical wire to which the bolt fastening terminal is connected is a thick electrical wire having a core cross-sectional area of 8 $mm^2$ or more, the thick electrical wire does not easily bend, and thus requires a large amount of arrangement space, but if the arrangement direction of the thick electrical wire is changed as described, it can be efficiently arranged in a small arrangement space.

Also, it is preferable that openings are provided in the lower wall of the terminal guide portion in a staggered arrangement relative to the openings in the upper wall. According to the above configuration, the terminal guide portion can be molded using upper and lower molds rather than using a slide mold, thus making it possible to reduce the manufacturing cost.

It is preferable that in the present electrical connection box, the electrical connection box is constituted by a fuse relay box, a relay box, or a fuse box for installation in an engine compartment that includes a portion above a tire house or wheel well for a front wheel of an automobile, the terminal guide portion is provided at a shallow location in the electrical connection box that corresponds to an upper end of the wheel well, and the bolt fastening terminal connected to an end of the thick electrical wire is inserted into and connected to the terminal guide portion.

As described above, the present electrical connection box is provided with the terminal guide portion into which the bolt fastening terminal connected to the end of the electrical wire is inserted laterally in the horizontal direction, and the general-purpose bolt fastening terminal can be precisely held in the correct orientation in the terminal guide portion. Accordingly, there are various advantages, such as that the electrical wire can be arranged in the horizontal direction, the electrical connection box can be installed in a space having a small vertical height, the electrical wire route can be simplified, a general-purpose terminal can be used as the bolt fastening terminal connected to the end of the electrical wire, and a rise in cost can be prevented.

DRAWINGS

Figure 4A:
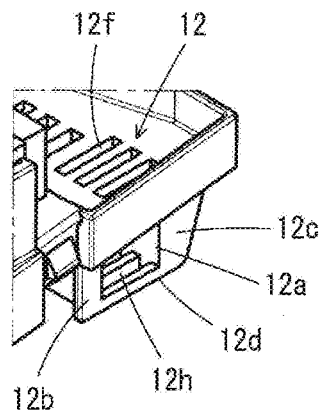
Figure 4B:
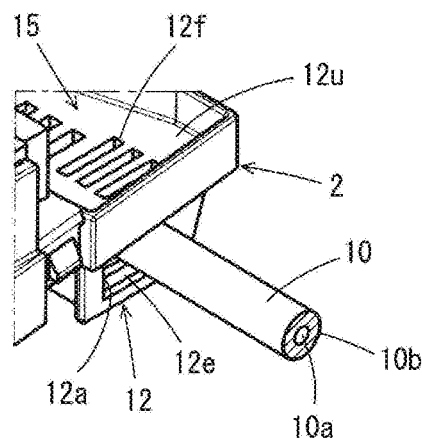
Figure 4C:
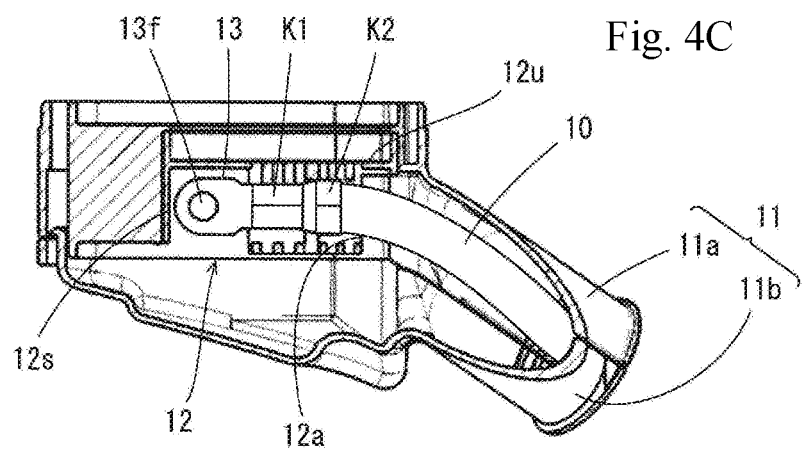
Figure 5A:
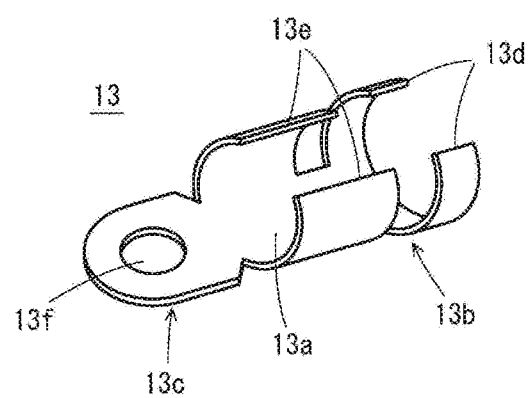
Figure 5B:
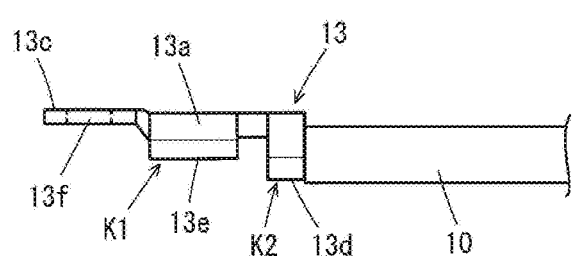
Figure 5C:
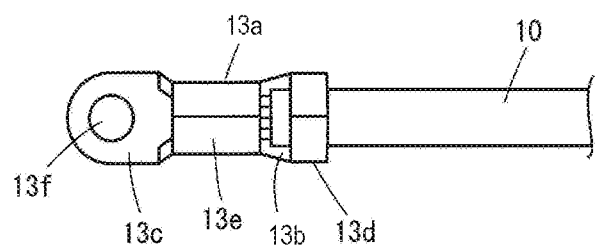
Figure 6A:
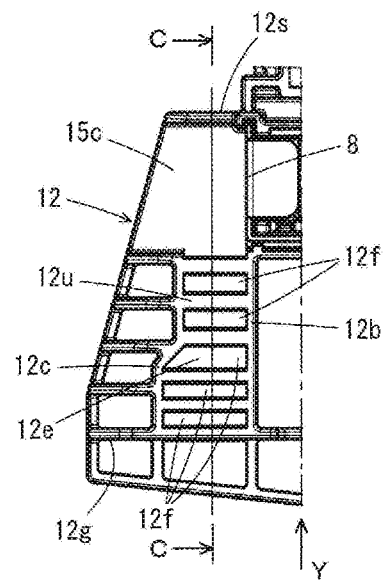
Figure 6B:
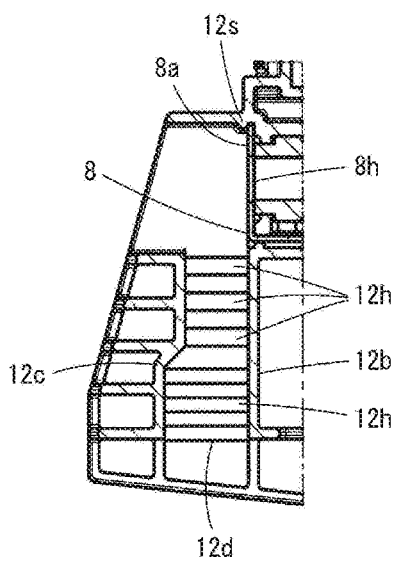
Figure 6C:
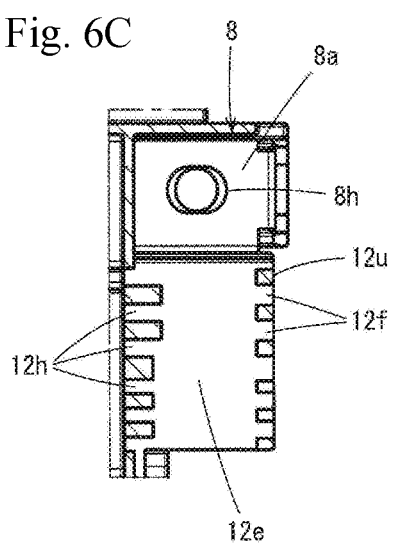
Figure 7A:
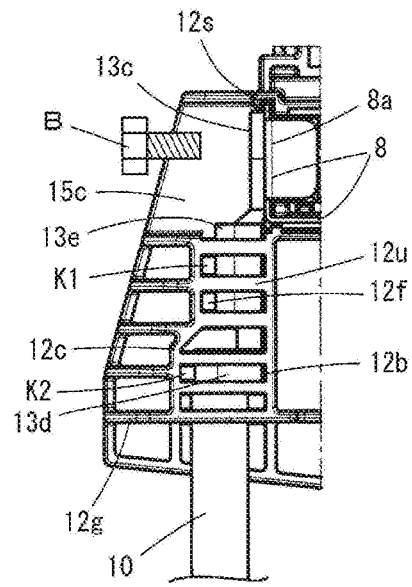
Figure 7B:
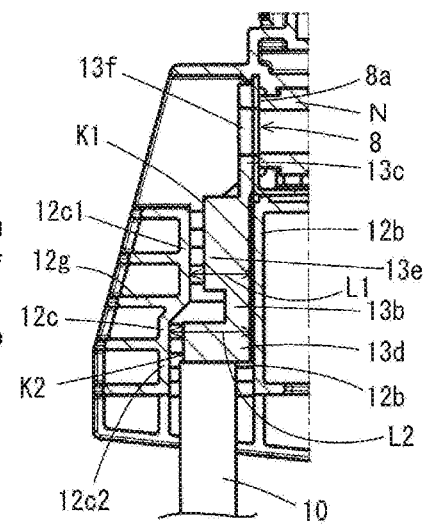
Figure 7C:
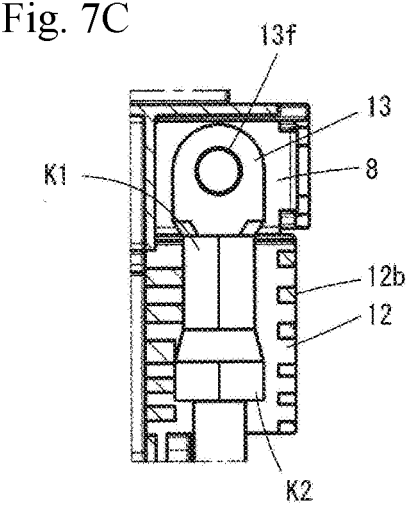
Figure 8A:
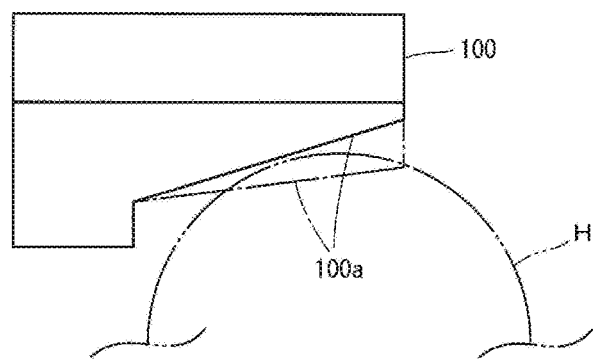
Figures 8B, 8C, 8D:
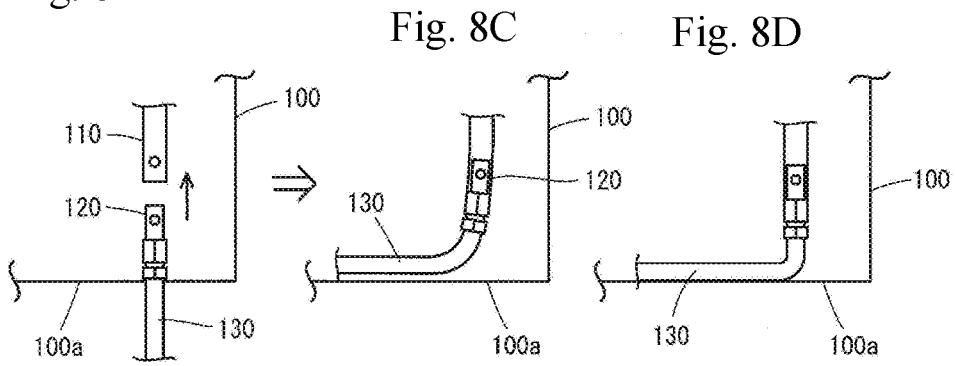
Figure 9A:
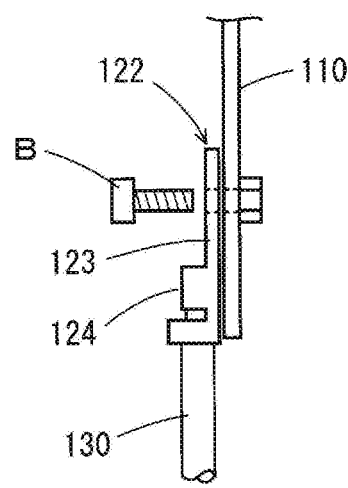
Figure 9B:
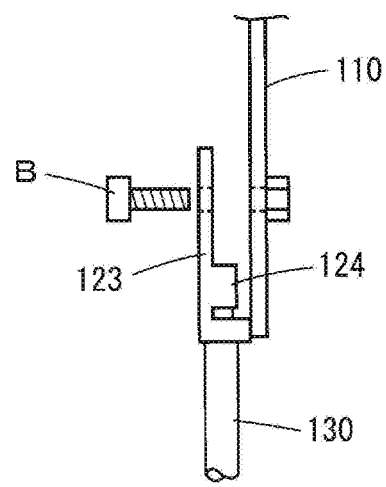
Figure 10A:
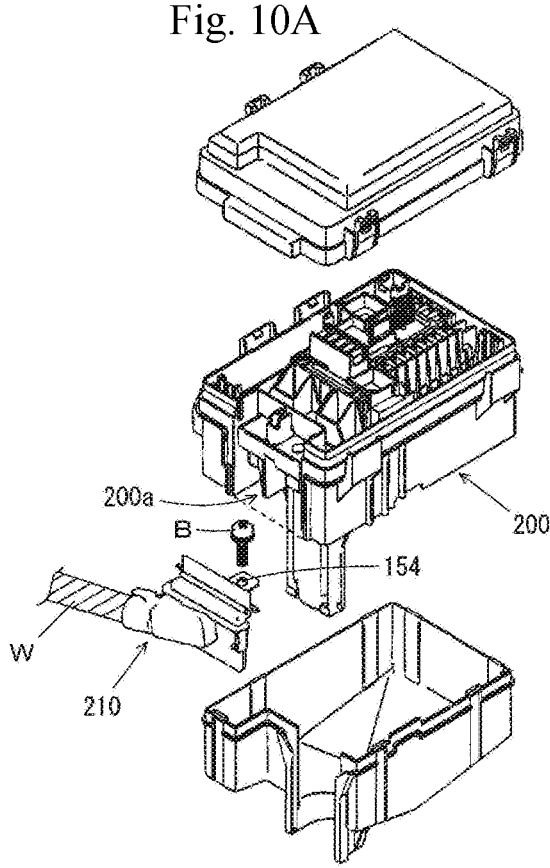
Figure 10B:
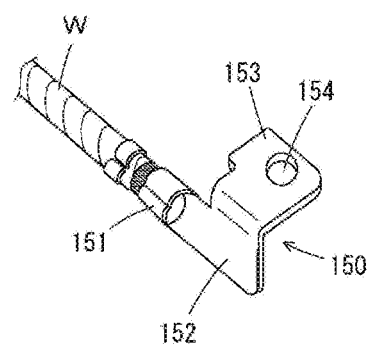

FIGS. 4A, 4B, and 4C show a portion in which an electrical wire having a bolt fastening terminal connected to its end is connected to the electrical connection box, where FIG. 4A is an enlarged perspective view of a relevant portion before connection of the electrical wire, FIG. 4B is an enlarged perspective view of a relevant portion after connection of the electrical wire, and FIG. 4C is a partial cut-away side view of a state in which the electrical wire has been connected;

FIG. 5A is a perspective view of the bolt fastening terminal, which is constituted by a general-purpose part, FIG. 5B is a side view of a state in which the electrical wire has been connected to the bolt fastening terminal by crimping, and FIG. 5C is a plan view of the state shown in FIG. 5B;

FIGS. 6A, 6B, and 6C show a terminal guide portion provided on a case main body of the electrical connection box, where FIG. 6A is a plan view of a relevant portion, FIG. 6B is a horizontal cross-sectional view of the state shown in FIG. 6A, and FIG. 6C is a cross-sectional view taken along a line C-C in FIG. 6A;

FIGS. 7A, 7B, and 7C show a state in which the electrical wire with the bolt fastening terminal connected thereto has been inserted into the terminal guide portion, and FIGS. 7A, 7B, and 7C are diagrams that correspond to FIGS. 6A, 6B, and 6C;

FIGS. 8A, 8B, 8C and 8D are diagrams showing conventional problems;

FIG. 9A is a diagram showing a state in which the bolt fastening terminal has been attached to a bus bar in the proper direction, and FIG. 9B is a diagram showing a state in which the bolt fastening terminal has been erroneously attached to the bus bar;

FIGS. 10A and 10B are perspective views showing a conventional example; and

Figure 11:
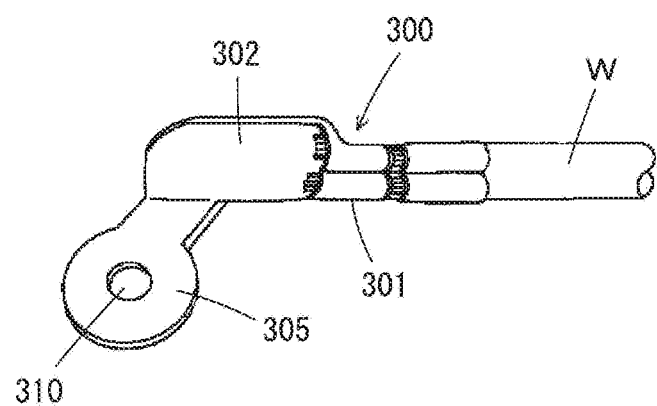

FIG. 11 is a perspective view showing another conventional example.

DESCRIPTION

Hereinafter, an embodiment of the present electrical connection box will be described with reference to FIGS. 1 to 7C.

An electrical connection box 1 may be a fuse relay box that is installed above a wheel well 90 of a front wheel in an engine compartment of an automobile. The electrical connection box 1 has an approximately rectangular shape in which the front-back direction is longer than the lateral width, and is positioned such that a portion from the central portion thereof to the rear end is above the wheel well 90, and the front portion is positioned forward of the wheel well 90. With the electrical connection box 1 installed at the above-described position, it is possible to obtain sufficient height for the installation space for the front portion that is not influenced by the wheel well 90, but the height of the installation space for the rear-half portion that is influenced by the wheel well 90 is half or less than the height for the front portion.

The electrical connection box 1 is formed by surrounding the outer periphery of a case main body 2 with a main body cover 3, and assembling a lower cover 4 and an upper cover 5 to the main body cover 3. The case main body 2 is provided with a fuse installation portion 6 and a relay installation portion 7. A fuse and a relay are respectively installed in the fuse installation portion 6 and the relay installation portion 7 of the case main body 2, a bus bar 8 connected to the input-side terminals of the fuse and the relay is accommodated in the case main body 2, and then the lower cover 4 and the upper cover 5 are joined to the main body cover 3 in a locked manner.

A thick electrical wire 10 that serves as a power supply line connected to the bus bar 8 passes through an electrical wire insertion portion 11, which is provided at the rear end that is the shallow portion of the electrical connection box 1, and is drawn out in the horizontal direction to the outside. The electrical wire insertion portion 11 includes an upper semicircular arc tube 11a that projects from the rear end of a side wall of the main body cover 3, and a lower semicircular arc tube 11b that projects from the rear end of a side wall of the lower cover 4, and these two tubes are joined together vertically to form the electrical wire insertion portion 11. Note that other input-side electrical wires and output-side electrical wires are also inserted into the electrical wire insertion portion 11.

Also, an electrical wire insertion portion 31 projects in the horizontal direction from the front end of the main body cover 3 and the lower case 4, and multiple electrical wires 9 connected to the output-side terminals of the fuse and the relay installed in the fuse installation portion 6 and the relay installation portion 7 are drawn to the outside through the electrical wire insertion portion 31. The front portion of the electrical connection box 1 where the electrical wire insertion portion 31 is provided is a deep portion, and therefore the electrical wires 9 are bent in the deep bottom portion of the lower case 4 and pointed upward, and the terminals (not shown) connected to the ends of the electrical wires 9 are pointed upward and connected to the relay, the fuse, and the bus bar in the case main body 2.

As shown in FIG. 4B, the thick electrical wire 10 (hereinafter, abbreviated to "electrical wire 10"), which is located on the rear end side of the electrical connection box 1 that is the shallow portion, is constituted by a round electrical wire that includes a core wire 10*a* coated by an insulating coating 10*b*, and the cross-sectional area of the core wire 10*a* is 8 mm$^2$ or more. A general-purpose bolt fastening terminal 13 shown in FIGS. 5A to 5C is connected to the end of the electrical wire 10 by crimping. The bolt fastening terminal 13 is provided with a base plate portion 13*a* constituted by a conductive metal plate, an electrical wire connection portion 13*b* provided on the rear side portion of the base plate portion 13*a*, and an electrical contact portion 13*c* provided on the front side portion of the base plate portion 13*a*. At the rear end of the electrical wire connection portion 13*b*, an insulating coating barrel 13*d* projects from the two ends in the width direction, and a core wire barrel 13*e* projects from the two sides in the width direction in front of the insulating coating barrel 13*d*. The base plate portion of the electrical contact portion 13*c* has a circular shape, and a bolt hole 13*f* is provided in the center.

The bolt fastening terminal 13 and the electrical wire 10 are connected by stripping the insulating coating 10*b* at the end of the electrical wire 10 to expose the core wire 10*a*, crimping the core wire barrel 13*e* of the bolt fastening terminal 13 around the core wire 10*a*, and crimping the insulating coating barrel 13*d* around the insulating coating 10*b*. As shown in FIG. 7B, in the connected state, a crimped portion K2 formed by the insulating coating barrel 13*d* is higher than a crimped portion K1 formed by the core wire barrel 13*e*, and the core wire barrel crimped portion K1 projects more than the electrical contact portion 13*c* provided with the bolt hole 13*f*. In other words, the bolt fastening terminal 13 is shaped so as to have three heights in the range from the front end of the electrical contact portion 13*c* to the rear end of the electrical wire connection portion 13*b*.

Figure 1:
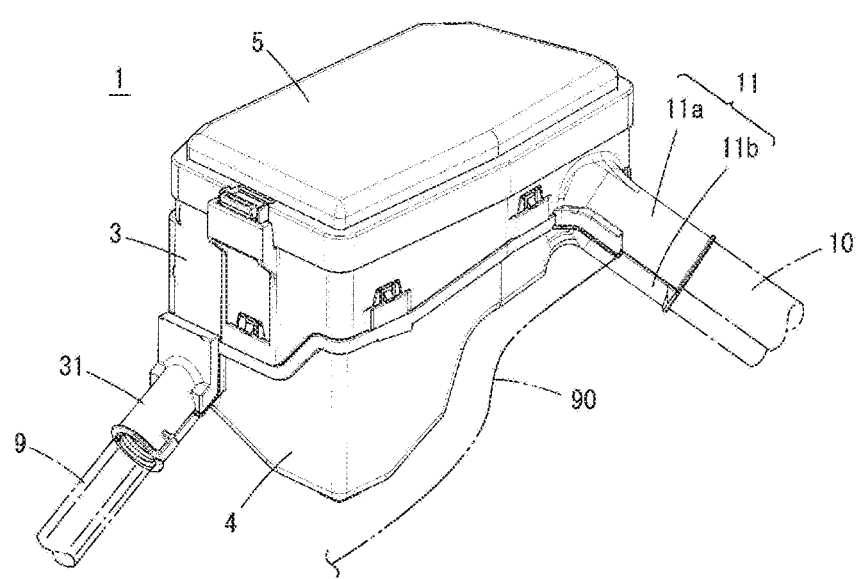
FIG. 1 is a perspective view of an electrical connection box according to an embodiment of the present invention.
Figure 2:
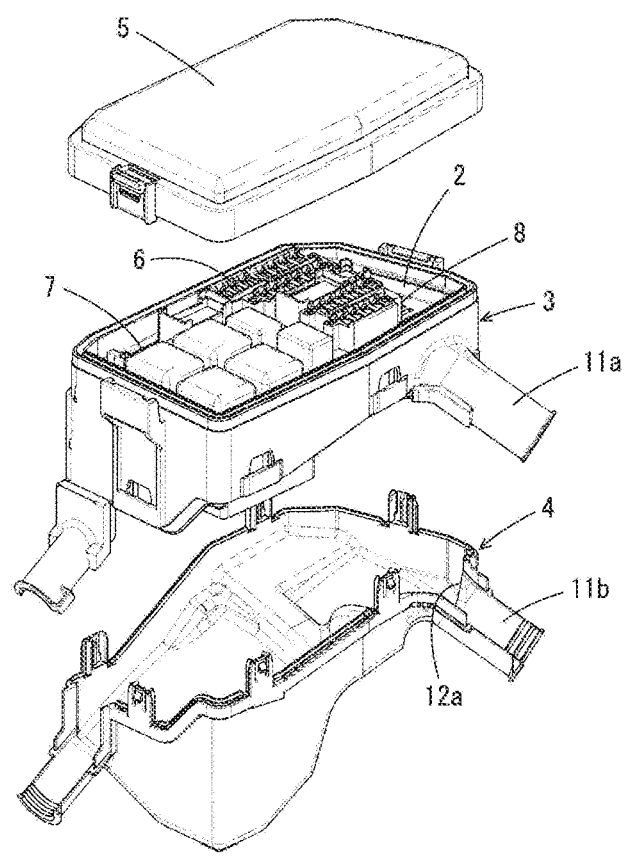
FIG. 2 is an exploded perspective view of the electrical connection box.
Figure 3:
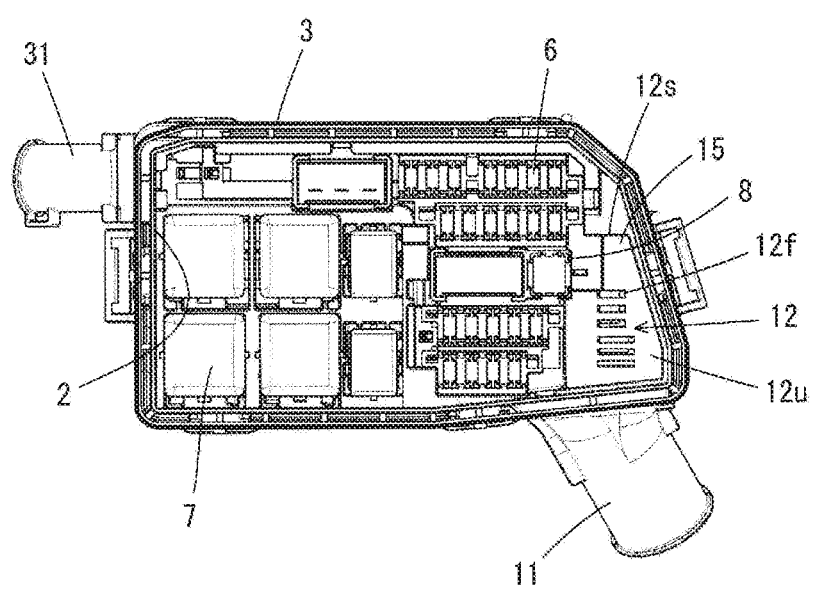
FIG. 3 is a plan view of the electrical connection box where an upper cover has been removed.

An insertion hole 12*a* of a terminal guide portion 12 provided in the case main body 2 is located at a back end position in the electrical wire insertion portion 11 that receives the electrical wire 10 with the bolt fastening terminal 13 connected thereto. As shown in FIG. 3, the terminal guide portion 12 is provided on the right-side rear end portion of a horizontal base plate portion 15 of the case main body 2. A corner portion of the horizontal base plate portion 15 is an upper wall 12*u*, an abutting wall 12*s* is provided projecting from the lower surface of the upper wall 12*u*, and the tip of the electrical contact portion 13*c* of the bolt fastening terminal 13 inserted through the insertion hole 12*a* abuts against the abutting wall 12*s* so as to be positioned and held. Also, two side walls 12*b* and 12*c* are provided projecting from the lower surface of the upper wall 12*u*, the lower ends of the two side walls 12*b* and 12*c* are connected by a lower wall 12*d*, and a terminal holding space 12*e* is formed by the square tube-shaped hollow portion surrounded by these upper, lower, left, and right walls.

The upper wall 12*u* of the terminal guide portion 12 has a lattice configuration due to providing multiple visual check openings 12*f* at intervals in a terminal insertion direction Y, and openings 12*h* are provided in a staggered arrangement in the opposing lower wall 12*d*. By providing the openings 12*f* and 12*h* in an alternating manner in the upper and lower walls 12*u* and 12*d* in this way, molding can performed with simply upper and lower molds during molding, and there is no need for a slide mold.

Also, as shown in FIGS. 7A to 7C, out of the two opposing side walls 12*b* and 12*c* of the terminal guide portion 12, the side wall 12*b* on the case interior side is a flat plate-shaped side wall for contact with the reverse side of the base plate portion 13*a*, which is constituted by the flat plate of the electrical wire connection portion 13*b* of the bolt fastening terminal 13, as a vertical surface (longitudinal surface).

The outer side wall 12*c* that opposes the side wall 12*b* is simply a portion that surrounds the electrical wire connection portion 13*b* of the bolt fastening terminal 13, and is not provided with a portion that surrounds the electrical contact portion 13*c*. A bolt fastening space 15*c* is provided for insertion of the bolt B from the outer end of the horizontal base plate portion 15 into the bolt hole 13*f* of the electrical contact portion 13*c* of the bolt fastening terminal 13. Also, the side wall 12*c* is provided with steps 12*c*1 and 12*c*2 that correspond to the steps of the insulating coating barrel crimped portion K2 and the core wire barrel crimped portion K1 of the bolt fastening terminal, and a dimension L1 between the opposing surfaces of the side walls 12*c*1 and 12*b* is different from a dimension L2 between the opposing surfaces of the side walls 12*c*2 and 12*b*. Accordingly, if an attempt is made to mistakenly insert the bolt fastening terminal 13 into the terminal guide portion 12 in the opposite orientation, the crimped portion K2 comes into contact with the side wall 12*b* and cannot be inserted, and therefore the mistaken orientation during insertion of the bolt fastening terminal 13 will be realized, and it is possible to make a correction to the correct orientation. Also, reinforcing fins 12*g* project from the outer surface of the outer side wall 12*c*.

A bolt fastening portion 8*a* of the vertical bus bar 8 arranged inside the case main body 2 is arranged along the interior-side inner surface of the side wall 12*b* with which the electrical contact portion 13*c* of the bolt fastening terminal 13 comes into contact, and a bolt hole 8*h* provided in the bolt fastening portion 8*a* is provided at a position in communication with the bolt hole 13*f* of the bolt fastening terminal 13. Also, a nut N is welded in advance to the reverse side of the bolt fastening portion 8*a* so as to surround the bolt hole 8*h*.

Due to providing the electrical connection box 1 with the terminal guide portion 12, even if the general-purpose bolt fastening terminal 13 is connected to the end of the electrical wire 10 that is a thick electrical wire that is not easily bent, it is possible to insert the bolt fastening terminal 13 into the terminal guide portion 12 without making a mistake in the orientation of the bolt fastening terminal 13, and with the electrical wire 10 in the correct horizontally lateral orientation, and the electrical wire 10 can be drawn out laterally from the side surface rather than from the bottom surface of the electrical connection box 1. Accordingly, the electrical connection box 1 partially has a shallow depth, and the electrical wire 10 can be drawn out horizontally and laterally from the location where the electrical wire 10 cannot be drawn out downward. In other words, the electrical connection box 1 can be installed above the wheel well, where the height of the electrical connection box 1 needs to be reduced, it is possible to effectively utilize a small amount of space, and electrical components can be arranged densely in an automobile. Moreover, a general-purpose bolt fastening terminal rather than a specially shaped dedicated part is used as the bolt fastening terminal 13 connected to the end of the electrical wire 10 laid out horizontally, thus making it possible to implement the bolt fastening terminal without a rise in cost, and thus the present electrical connection box has a high practical value.

Also, the shape of the terminal guide portion 12 provided in the electrical connection box is also simple and can be molded using upper and lower molds rather than using a slide mold, thus making it possible to reduce the manufacturing cost. Moreover, since the bolt fastening terminal 13 is inserted in a horizontally lateral orientation, the bolt fastening terminal 13 can be provisionally held inside the terminal guide portion 12 in the inserted state. In other words, if the bolt fastening terminal is inserted from below and faces upward, it falls due to its own weight, but it if is inserted in a horizontally lateral orientation, and also the side wall 12c of the terminal guide portion 12 has a stepped shape that conforms to the crimped portions K1 and K2, the bolt fastening terminal 13 is not likely to fall out from the terminal guide portion 12, and the bolt fastening terminal 13 can be provisionally held until it is actually fixed by fastening with the bolt B and the nut N, thus making it possible to improve the ease of the fastening task.

Furthermore, since the visual checking openings 12f are provided in the upper wall 12u of the terminal guide portion 12, there are various advantages, such as that whether or not the bolt fastening terminal 13 has been inserted into and held in the terminal guide portion 12 in the correct state can be visually checked before performing bolt fastening.

The present invention is not limited to the embodiment described above, and can be favorably used when connecting a bolt fastening terminal to the end of an electrical wire and connecting the bolt fastening terminal to an electrical connection box with the electrical wire in a horizontally lateral orientation. Also, the bolt fastening terminal may be a general-purpose part that includes an electrical wire connection portion and only a core wire barrel provided thereon.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An electrical connection box, comprising:
a horizontal terminal guide portion is provided inside the electrical connection box, and an insertion hole for a tip of the terminal guide portion is provided in a side wall of the electrical connection box;
a bolt fastening terminal is provided with a bolt hole in a flat plate-shaped electrical contact portion connected to an electrical wire connection portion provided with a barrel, the bolt fastening terminal is connected to an end of an electrical wire, the bolt fastening terminal and the electrical wire are oriented in a horizontal direction, the bolt fastening terminal is inserted into the terminal guide portion, the electrical wire connection portion is held by the terminal guide portion, and the electrical contact portion extending from the electrical wire connection portion is bolt-fastened to a bus bar accommodated in the electrical connection box; and
the terminal guide portion includes a side wall that has a step conforming to a shape of a barrel crimped portion of the bolt fastening terminal, a flat plate-shaped side wall that opposes the side wall that has the step, and upper and lower walls, is shaped so as to be fitted with and hold the electrical wire connection portion, and does not allow insertion of the bolt fastening terminal into the terminal guide portion in an opposite orientation, and visual check openings are provided in the upper wall of the terminal guide portion.

2. The electrical connection box according to claim 1, wherein the terminal guide portion receives insertion of and holds the electrical wire connection portion of the bolt fastening terminal, a back surface side of the electrical contact portion of the bolt fastening terminal that projects more than the terminal guide portion is brought into contact with a bus bar accommodated and held in the electrical connection box, a front surface side of the electrical contact portion is positioned so as to face a bolt insertion space, and a bolt is inserted in a lateral orientation into the bolt insertion space from the outside and fastened to a nut provided on a back surface of the bus bar.

3. The electrical connection box according to claim 1, wherein the electrical wire to which the bolt fastening terminal is connected is a thick electrical wire having a core cross-sectional area of 8 mm$^2$ or more.

4. The electrical connection box according to claim 1, wherein openings are provided in the lower wall of the terminal guide portion in a staggered arrangement relative to the openings in the upper wall.

5. The electrical connection box according to claim 1, wherein the electrical connection box is a fuse relay box, a relay box, or a fuse box for installation in an engine compartment that includes a portion above a wheel well for a front wheel of an automobile, the terminal guide portion is provided at a shallow location in the electrical connection box that corresponds to an upper end of the wheel well, and the bolt fastening terminal connected to an end of the electrical wire is inserted into and connected to the terminal guide portion.

* * * * *